United States Patent
Desai et al.

(10) Patent No.: US 6,922,716 B2
(45) Date of Patent: Jul. 26, 2005

(54) METHOD AND APPARATUS FOR VECTOR PROCESSING

(75) Inventors: Vipul Anil Desai, Hoffman Estates, IL (US); David P. Gurney, Des Plaines, IL (US); Benson Chau, Mt. Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 732 days.

(21) Appl. No.: 09/905,441

(22) Filed: Jul. 13, 2001

(65) Prior Publication Data

US 2003/0014457 A1 Jan. 16, 2003

(51) Int. Cl.⁷ .............................................. G06F 17/16
(52) U.S. Cl. ...................................... 708/524; 712/9
(58) Field of Search ................................ 708/490, 518, 708/524; 712/9

(56) References Cited

U.S. PATENT DOCUMENTS

| | | | | |
|---|---|---|---|---|
| 4,853,890 A | * | 8/1989 | Abe et al. ...................... 712/4 |
| 5,887,183 A | * | 3/1999 | Agarwal et al. ................ 712/2 |
| 6,061,521 A | * | 5/2000 | Thayer et al. .................. 712/9 |
| 6,078,941 A | * | 6/2000 | Jiang et al. .................. 708/625 |
| 6,219,775 B1 | * | 4/2001 | Wade et al. ................... 712/11 |
| 6,324,638 B1 | * | 11/2001 | Elmer et al. ................... 712/17 |
| 6,334,176 B1 | * | 12/2001 | Scales et al. ................... 712/4 |
| 2003/0070059 A1 | * | 4/2003 | Dally et al. ..................... 712/7 |

* cited by examiner

*Primary Examiner*—D. H. Malzahn
(74) *Attorney, Agent, or Firm*—Kenneth A. Haas

(57) ABSTRACT

A processor includes a first vector processing unit including a first register file and first vector arithmetic logic unit; a second vector processing unit including a second register file and second vector arithmetic logic unit wherein the first register file has a first plurality of cross connections to the second vector arithmetic logic unit; wherein the second register file as a second plurality of cross connections to the first vector arithmetic logic unit.

12 Claims, 7 Drawing Sheets

METHOD AND APPARATUS FOR VECTOR PROCESSING

FIELD OF THE INVENTION

The present invention relates to vector processing including but not limited to a processor that is optimized for communications signal processing.

BACKGROUND OF THE INVENTION

Modern communication systems perform a broad range of signal processing functions and tasks such as filtering, channel equalization, signal parameter estimation, transforms, and correlations. Digital signal processors (DSPs) are often preferred for implementing these tasks because DSPs have shorter development cycles and have the flexibility to adapt to changes in system requirements. Traditional DSPs suffer, however, from various drawbacks such as a lack high throughput signal processing capacity and a lack of I/O (input/output) bandwidth. In the past, these shortcomings have been addressed by equipping DSPs with hardware coprocessors or accelerators, and direct memory access (DMA) channels. Adding such additional hardware has increased the cost and complexity of communication systems and still, general purpose DSPs have not demonstrated the throughput or capacity for higher data rates that next generation systems will require. Although increasing processor speed and adding hardware accelerator components help, such solutions are unattractive in terms of development time because they are application-specific and result in increased design complexity. Increased operating speeds also result in an increase in processor power consumption.

The invention of the present application provides a new processor architecture that is especially suitable for rapid handling of operations typically encountered in signal processing applications. The architecture is extremely well suited for performing high throughput signal processing tasks such as parallel (or vector) processing for complex and matrix arithmetic, operations on oversampled complex data with variable dynamic ranges, specialized communications algorithm (e.g., Viterbi) operations, and so forth, and does so without adding significantly to the cost or power consumption of the processor.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The processor of the present invention employs a scalable dual, single instruction multiple data (dual-SIMD) architecture to achieve a high level of parallelism for complex arithmetic-based digital signal processing. The dual datapath architecture facilitates complex arithmetic operations that are prevalent in a multitude of communication, engineering, and scientific applications. The extensive parallelism also enables operation at lower clock speeds and lower supply voltages, thereby reducing power consumption. The processing architecture may be implemented as a coprocessor to augment another processor's signal processing capabilities, or alternatively, it may be implemented in a stand-alone processor core.

Figure 1:
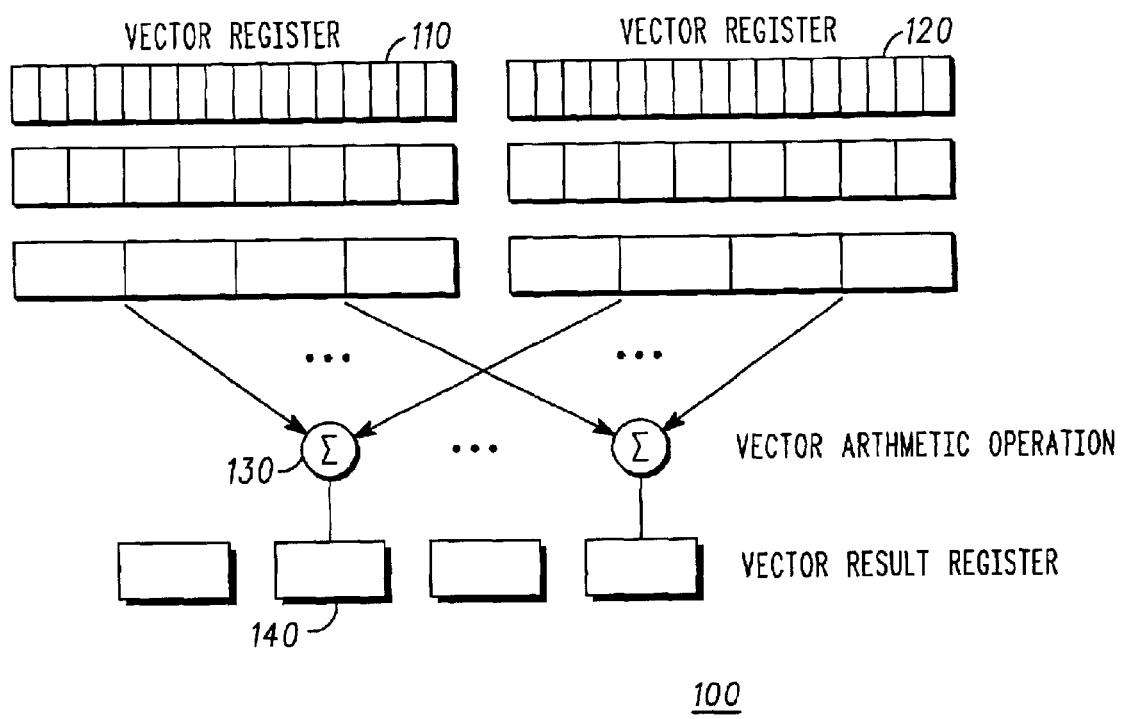
FIG. 1 shows a functional diagram of an example of a dynamically scalable single instruction multiple data (SIMD) instruction operation in accordance with the invention.

FIG. 1 provides an example of the dynamic scalability of the present invention. In FIG. 1, a 128-bit vector arithmetic logic unit (ALU) 100 is partitioned into units of various bit-lengths to perform identical and parallel (e.g., in the same clock cycle) operations (e.g., addition) by ALU elements (e.g., summers) 130 on operands varying in size from 8 to 32 bits. The results of the operation are stored in vector result register 140. Vector data consists of several related elements (also termed fields or subwords) of data. A group of related elements of data forms a vector, which is treated as a single entity from the processor's point of view. As shown, Vector registers 110 and 120 are partitioned into various size slices depending on the required bit-length or precision of the operands. For example, Vector registers 110 and 120 may be partitioned or "sliced" into four 32-bit operands, eight 16-bit operands, or sixteen 8-bit operands, and so forth. Vector arithmetic operations including, but not limited to, addition, subtraction, multiplication, division, absolute differences, averages, scaling, compound instructions in which two or more operations are combined in a single cycle, and other application-specific instructions, may then be performed by the present invention on operands of various bit-lengths in a single cycle. The preferred embodiment performs all of these operations in a single clock cycle, though the vector processor design if pipelined for higher clock rates may perform the operations within a single instruction cycle (which would typically be comprised of multiple clock cycles), without departing from the spirit of the invention. The dynamic scalability of the present invention provides a powerful and efficient method of increasing processor throughput and decreasing overhead (e.g., current drain, cost, etc.) when compared to traditional fixed-precision processors, particularly for processing communications algorithms, which have a high degree of inherent data parallelism and specific precision requirements. A majority of the signal processing in communications algorithms may be mapped to parallel intrafield operations.

Figure 2:
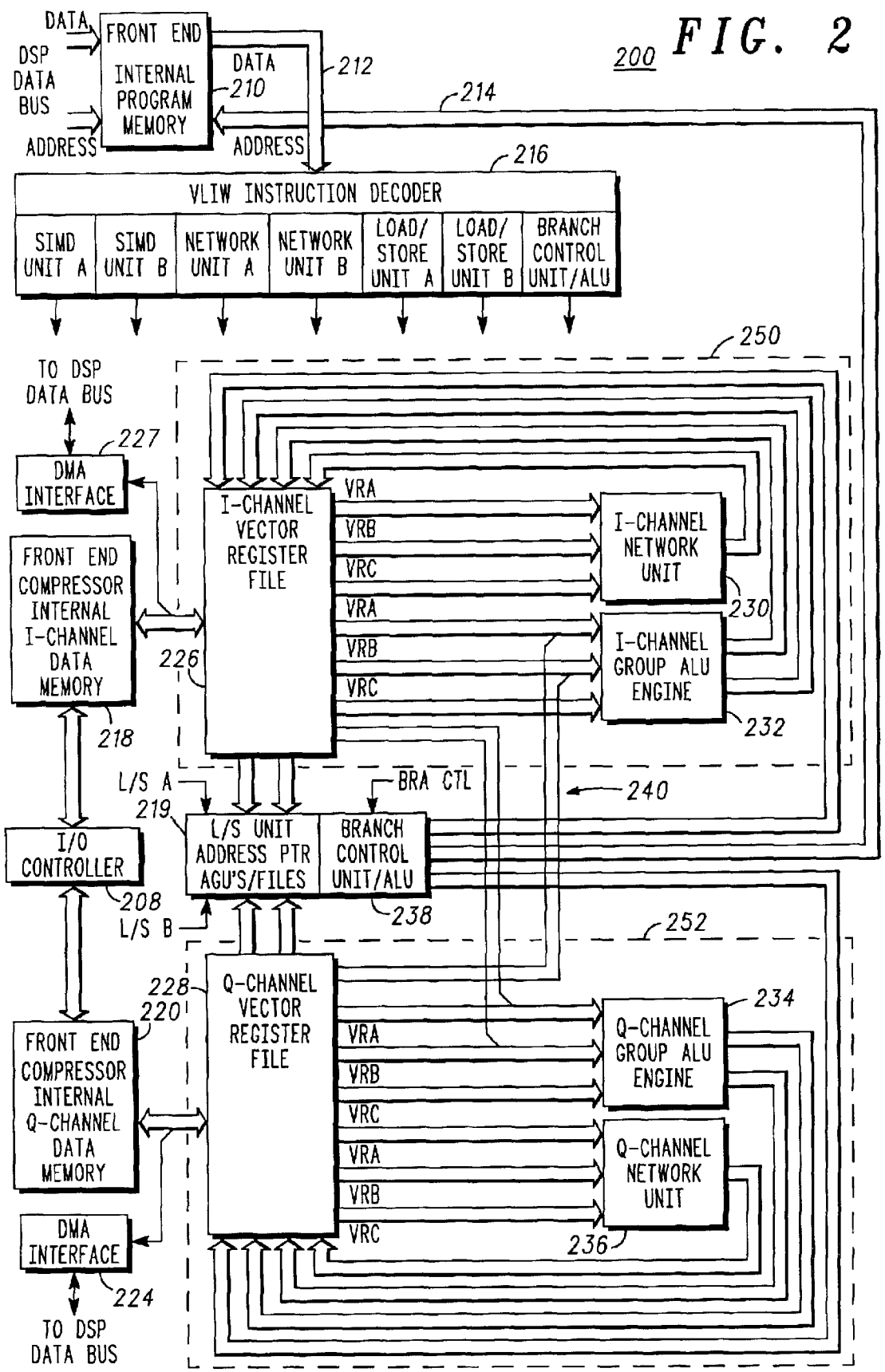
FIG. 2 shows a high level functional diagram of a processing architecture in accordance with the invention.

FIG. 2 shows an example of a high level block diagram of a dual-SIMD processor 200 according to the present invention. The architecture is essentially a dual-"Harvard" load-store vector processor architecture, including dual datapaths, data memories, vector register files, load/store units, vector arithmetic, and vector network units. The processor architecture is based around the model of processing data simultaneously in real (in-phase or I-channel) and imaginary (quadrature or Q-channel) signal components in communications signal processing. Thus, all vector functional units, vector register files and load/store units are in pairs, one unit for handling real components and the other unit for handling imaginary components. Note that the dual channel architecture could also handle data with other formats and data structures, such as polar (magnitude and phase) signal representations for example. The processor is also designed to handle specially paired instructions which, in many cases, will facilitate complex arithmetic. Vector processing unit (VPU) 250 is the basic functional unit for processing data from the in-phase (I-channel) or real part of a complex signal. VPU 252 is the basic functional unit for processing data from the quadrature (Q-channel) or imaginary part of a complex signal.

VPUs 250 and 252 both include a number of functional sub-units. VPU 250 includes vector register file 226 and vector (or group) arithmetic logic units (ALU) 232. Similarly, VPU 252 includes vector register file 228 and vector ALUs 234. Vector register files 226 and 228 provide data storage for their respective ALUs and are also accessible (in the same clock cycle) by the ALU of the other channel via a plurality of cross connections 240, described in more detail, below. Vector register files 226 and 228 are, for example, 32 by 128-bit register files and are connected via 128-bit data buses to vector network units 230 and 236, respectively.

VPUs 250 and 252 both include separate computational engines for performing vector arithmetic operations and for performing vector network and logical operations. Group (or vector) ALU engines 232 and 234 perform simple and complex vector arithmetic operations, and vector network units 230 and 236 perform vector network and logical operations (e.g., field manipulations such as data reordering and shifts).

Processor 200 also includes a Branch Control Unit (BCU) 238, which in this example contains a 16-bit scalar arithmetic ALU for evaluating branch conditions and updating indexes. One case where branch conditions are evaluated is to control program flow. Thus, whenever there is a branch in the program code BCU 238 evaluates data conditions and performs conditional (or unconditional) jumps to modify the program counter. The indexes, for example, can represent variables that are used inside software loops. BCU 238 functions to directly alter the program flow using, for example, function pointers, branches, jumps, subroutine calls, subroutine returns, and loop constructs. Another function of BCU 238 is to serve as a general purpose scalar ALU so that it can be used to modify indexes and other counters to alter and control the program flow.

Additionally, processor 200 includes dual load/store (L/S) units 219 (L/SA and L/SB—one associated with each vector processing unit) which handle all data movement to and from internal data memories (instances 218 and 220). Note that other ALU sizes (bit precisions) could be used throughout the design without departing from the spirit of the invention. The data and program memories could also be unified into a single memory or cache without departing from the spirit of the invention.

Processor 200 also includes internal I-channel data memory 218 and internal Q-channel data memory 220. Internal I-channel data memory 218 and internal Q-channel data memory 220 are sufficiently large to permit most calculations to be performed from internal memory. In one example, internal I-channel data memory 218 and internal Q-channel data memory 220 are 2K by 128-bit dual ported memories. As would be known to those of skill in the art, dual ported memory avoids processor and device contention for memory access. The dual ported memory of the present invention allows simultaneous access by I/O controller 208 and processor 200, permitting processor 200 to operate unhindered by external I/O access at maximum speed. Data memories 218 and 220 form an interface between an external I/O controller 208 and processor 200. Bi-directional internal data busses provide data pathways to and from data memories 218 and 220 and their respective VPUs. In the present invention memory data buses are 128 bits wide. Depending on design considerations, however, wider, narrower or multiple data buses could, of course, be used.

After data has been processed by processor 200 it can be stored back into data memory 218 and data memory 220 where it can be retrieved directly from the internal memories via data busses using Direct Memory Access (DMA) interfaces 224 and 227. DMA interfaces are well known in the art. In this example, DMA interface 224 is coupled to the data bus associated with internal Q-channel data memory 220 while DMA interface 227 is coupled to the data bus associated with internal I-channel data memory 218.

Control of the load store operations for both I-channel and Q-channel data memories is provided by load-store control unit 219 which includes address generation units (AGUs), ALUs for calculating addresses, and register files for control and configuration of the AGUs. As would be known to those of ordinary skill in the art, address pointers are frequently employed for indirect addressing. The present invention likewise includes a number of dedicated AGUs and ALUs in load-store unit 219 to calculate addresses using offset and modulo addressing techniques so that indirect addressing may be used. The AGUs and ALUs in load-store unit 219 may also be capable of post-increment and post-decrement indirect addressing techniques, which are well known in the art. Because processor 200 includes dual data memories, the present invention also provides for independent pointers to each channel's data memories. The load-store unit 219 permits simultaneous and independent addresses to be calculated for the I-channel and Q-channel data memories. Alternatively, pointers can be linked such that only one address needs to be generated to simultaneously address both the I-channel and the Q-channel data memory. Load-store unit 219 in one example of the present invention, includes a 32×16-bit address pointer register file.

Control fields for group arithmetic logic unit engines 232 and 234 govern field size (dynamic range or precision) for the operation and mode of operation, and provide for a wide variety of operations to be performed on the data. In the case of instructions directed to complex arithmetic where the rapid exchange of operands between the I-channel and Q-channel is desired, processor 200 permits both group ALU engines to have direct access to the register files of the of the other group ALU engine via cross connections 240, and thus to exchange data between the I-channel vector register file 226 and the Q-channel group ALU engine 234 and Q-channel vector register file 228 and the I-channel group ALU engine 232. In this way, operands are passed between the I-channel vector register file 226 and group ALUs 232 and 234, and the Q-channel vector register file 228 and group ALUs 232 and 234 within a single clock cycle to permit efficient complex arithmetic operations. For example, in a complex domain multiply operation, the imaginary term of the complex domain product requires multiplicands from the I-channel vector register file 226 and Q-channel vector register file 228. Cross connections 240 facilitate this complex multiply function. The sources of the signals on the cross connections 240 are typically provided by additional ports on the register files (two additional read ports for each register file 226 and 228, respectively), though the register file ports could be shared with other functional units in other embodiments. The destination of the signals on the cross connections 240 is typically multiplexing circuitry (described further below), which selectively muxes the signals onto the VRA and VRB input buses to the group ALU engines 234 and 232, respectively. Note that these cross connections could also be implemented at the outputs of the vector ALUs, or incorporated into the forwarding logic in pipelined processor implementations, though the preferred embodiment is shown.

Internal program memory 210 interfaces to a DSP bus or data bus of another processor, and is connected to very large instruction word (VLIW) instruction decoder 216 via a 128-bit instruction bus 212. Each VLIW instruction (or instruction packet) in VLIW instruction decoder 216 includes seven sub-instructions (opcodes) for the functional units of the processor. Each unit may be scheduled with one operation per clock cycle (or a NOP, if idle). The present invention is capable of executing seven instructions (or sub-instructions) per clock cycle (one to each functional unit), and up to four of those sub-instructions operate on data in vector format, allowing for extensive parallelism. In general, using the architecture of the present invention, 99 operations per clock cycle can be performed using 8-bit arithmetic: 16 (8-bit) additions & subtractions in each vector ALU engine 232 and 234, 16 (8-bit) shifts in each vector network unit 230 and 236, an AGU update in each load/store unit 219, and a scalar arithmetic operation in branch control unit 238 (resulting in ((16×2)×2+(16×2)+2+1→99 operations/cycle). In summary, processor 200 can perform two vector arithmetic operations (e.g.—multi-point MACs, addsubs, etc.), two vector network operations (e.g.—multi-point barrel shifts, logical operations, etc.), two load/store operations (with two data pointer updates), and a scalar arithmetic operation per clock cycle.

VLIW instruction decoder 216 decodes the 128-bit VLIW instruction from instruction bus 212 of program memory 210 to disperse sub-instructions to vector ALU (SIMD unit A) 232, vector ALU (SIMD unit B) 234, vector network unit A 230, vector network unit B 236, load-store unit 219 comprising load/store unit A and load/store unit B, and branch control unit/ALU 238. Note that additional operations could be performed in other embodiments by dispensing additional sub-instructions to additional functional units. In this embodiment, vector ALU 232 and vector ALU 234 can execute different sub-instructions each clock cycle. Similarly, vector network unit 230 and vector network unit 236 can execute different sub-instructions. The secondary instruction buses shown by arrows at the bottom of VLIW instruction decoder 216 are connected to the various units controlled by the instructions. Note that the sub-instructions may contain immediate data values (e.g., constants directly specified by the programmer) to control the operation of a particular instruction. The control lines have been omitted from the drawings for the sake of clarity and simplicity.

Figure 3:
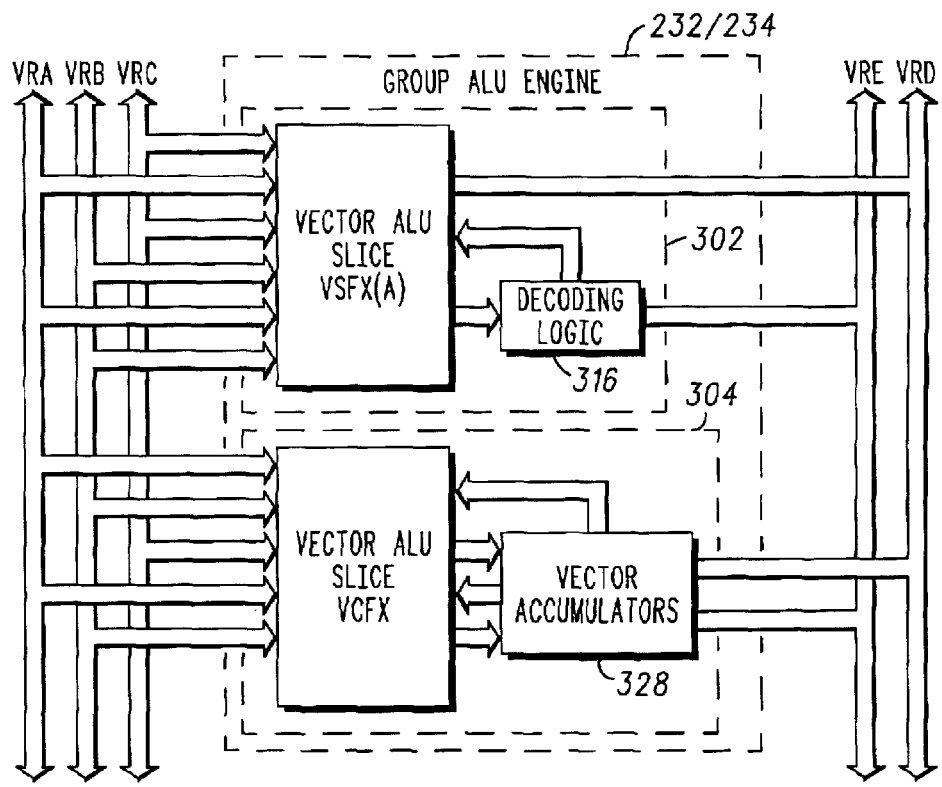
FIG. 3 shows a functional diagram of a first portion and a second portion of vector arithmetic logic units.

FIG. 3 shows a first and second portion of 32-bit slices of the group ALU engines 232 and 234 of FIG. 2 in more detail.

Group vector ALUs 232 and 234 are identical in function in this example. Group ALUs 232 and 234 are capable of performing dynamically scalable operations including multiplication, addition, etc. Thus, for example, a single 128-bit ALU is capable of performing either eight 16 by 16 bit multiplies or sixteen 8 by 8 bit multiplies, etc. Group ALUs 232 and 234 provide a hardware portion 302 to perform either simple vector arithmetic operations (e.g., addition, subtraction, etc.), and a hardware portion 304 for more complex vector arithmetic operations (e.g., multiplication) in a given clock cycle (both further described below). Note that both simple and complex vector arithmetic operations could be performed in the same cycle by providing additional instruction decoding logic 216 and register files 226 and 228 ports without departing from the spirit of the invention. Input (or source) data buses VRA, VRB, and VRC, and output (or destination) data buses VRD and VRE are each 128 bits wide in this example. In this example, group ALU 232/234 input busses VRA, VRB, and VRC are read from selected locations of register files 226 and 228. Further, group ALU 232/234 outputs VRD and VRE are written into selected locations of register files 226 and 228. Group ALU engines 302 and 304 include four identical 32-bit slices to make up 128-bit vector ALU engines in this example.

Figure 4:
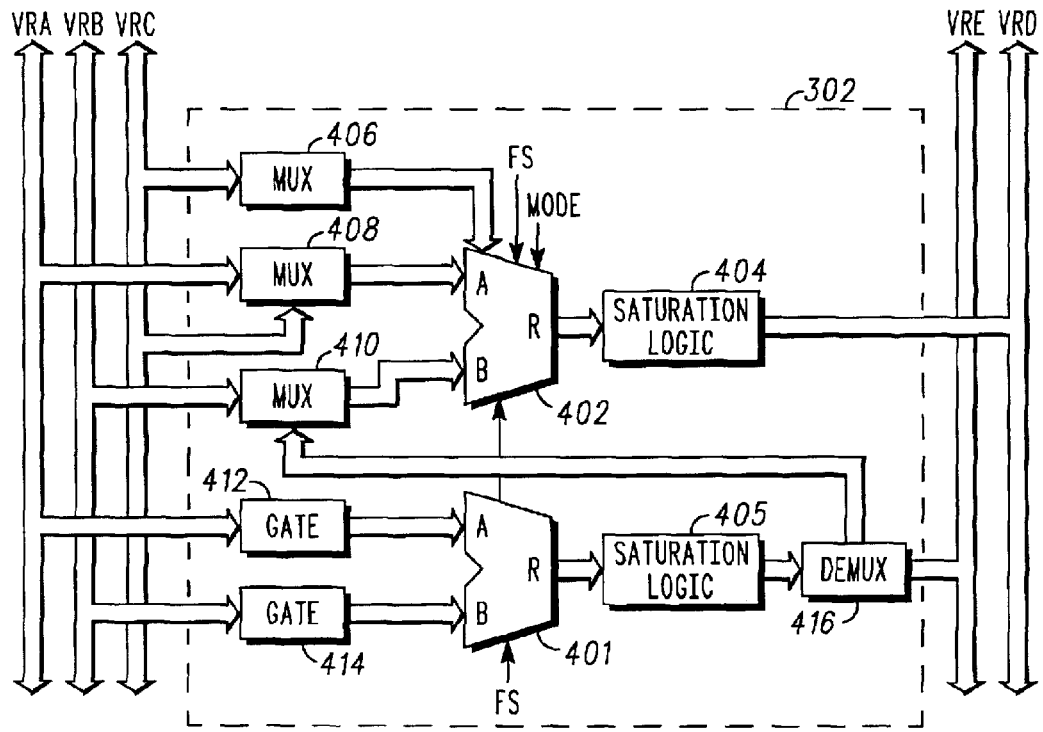
FIG. 4 shows a more detailed functional diagram of a first portion of the vector arithmetic logic unit in accordance with the invention.

FIG. 4 shows a hardware portion 302 of a 32-bit slice of group ALU 232 and data bus connections to and from hardware portion 302 of group ALU 232. Group ALU 234 (Q-channel) preferably also includes a hardware portion 302 and has essentially the same architecture and capabilities as (I-channel) group ALU 232. Vector group hardware portion 302 is responsible for simple vector arithmetic operations such as addition, subtraction, and the like. Hardware portion 302 of group ALUs 232 and 234 may be termed simple vector arithmetic units (VSFX(A)).

Group ALUs 232 and 234 have direct connections to three input data busses, VRA, VRB and VRC, and two output (or destination) data busses, VRD and VRE. MUXes 406, 408 and 410 provide selective access to data busses VRA, VRB and VRC which are also connected to I-channel vector register file 226 and to Q-channel vector register file 228. While multiplexers have been employed throughout the present embodiment to provide selective access, the selection function could also be implemented using a variety of other hardware such as other logic gates, crossbar switches, tri-state buses, dual ported memory, and the like, as would be familiar to one of ordinary skill in the art. For example, in this embodiment, multiplexer (MUX) 406 is used for conditional negate-and-add type instructions. MUX 406 in this case functions as "reducing logic" for reducing the VRC bus down to select a portion of the data on the VRC bus which is then used to control the operations performed by ALU 402 on individual elements of the vectors present on VRA and VRB. MUX 406 also affects dynamic scalability, for example, for 8, 16, or 32-bit conditional field-wise operations, such that the proper part of that bus is accessed, depending on both the field size of the operation (ie., 8, 16 or 32) and the position of the 32-bit ALU slice within the 128-bit vector word. In this way, group ALU 232 enables vector operations that individually add or subtract those elements from a data vector on the VRA bus, for example, to individual elements of a data vector on the VRB bus for example, based on a packed (bitwise) control field on the VRC bus (further described below). The packed control field could in one application, represent a spreading (or chipping) sequence for a direct sequence CDMA communications system.

I-channel ALU section 302 also includes field size (FS) selector which is used to control the field size of the operations performed by ALU 402. In addition, ALU 402 includes a mode select that governs the mode of operation of ALU 402, such as signed or unsigned, addition, subtraction, saturation modes, and the like. The arithmetic ALUs 401 and 402 operate on different field sizes by disabling carry propagation across field (or vector data element) boundaries, to allow independent arithmetic operations to simultaneously occur on multiple data elements within the same hardware.

A portion of I-channel (or Q-channel) simple vector arithmetic group ALU 232 (or 234) also preferably includes dedicated subtraction unit 401. Dedicated subtraction unit 401 (a vector arithmetic unit) is similar to ALU 402 in that it includes a field size select input. As the name implies, however, dedicated subtraction unit 401 operates only in subtraction mode. While the function of dedicated subtraction unit 401 could be performed by a standard ALU, the design can be simplified (and its operating speed increased and power consumption decreased) by providing a unit designed only for subtraction operations. Data flow to subtraction unit 401 is controlled by gates 412 and 414 which shunt the subtraction unit 401 off of the busses (i.e., disable the inputs) when the subtraction unit is not needed, as is performed on all other unused functional units on a per-clock cycle basis, thereby reducing power consumption.

A condition detect line is provided between dedicated subtraction unit (a vector arithmetic unit) 401 and ALU 402. The condition detect line is typically a bus that is 32/FS bits wide. The condition detect line can be used to communicate the sign of the results of a vector operation performed by dedicated subtraction unit 401 to ALU 402. The condition detect line is important for some compound operations (further described below) where the sign of the result from dedicated subtraction unit 401 is needed to determine which operation will be performed by ALU 402. The results from subtraction unit 401 and ALU 402 are passed through saturation logic 404, which saturates results to the maximum permissible value of the number representation, as is standard. Saturation logic 405 is similar in function to saturation logic 404.

Figure 5:
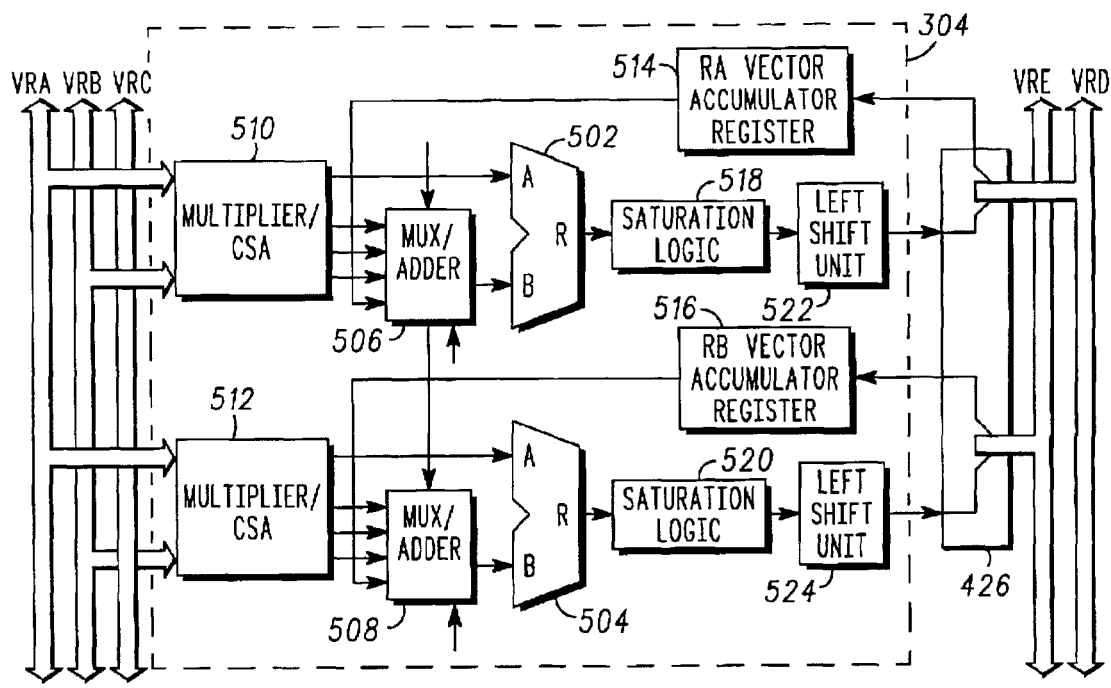
FIG. 5 shows a more detailed functional diagram of a second portion of the vector arithmetic logic unit in accordance with the invention.

An example of an additional hardware portion of the 32-bit slice of the 128-bit I-channel (or Q-channel) group ALU 232 (or 234) is shown in FIG. 5. This vector ALU hardware is responsible for more complex arithmetic operations such as multiplication and multiply-accumulate (MAC) operations. Thus, this portion of the group ALU may be termed a complex vector arithmetic unit (VCFX). Data is input into I-channel group ALU 232 from the register files via the VRA, VRB, and VRC buses, and output to the register files via the VRD and VRE buses. The ALU hardware comprises a pair of 8×8 and 16×16 multiplier/carry-save adders (CSA) 510 and 512. Multiplier/CSA 510 is for handling even-numbered multiplier products and Multiplier/CSA 512 is for handling odd-numbered multiplier products, respectively, on the bus. The use of carry-save adders is a standard high speed method of accumulating partial products in the multiplication process. Thus, for example, elements zero, two, four and six of a vector of 16-bit data elements on a 128-bit data bus would be handled by Multiplier/CSA 510 while elements one, three, five and seven would be handled by Multiplier/CSA 512. Multiplier/CSAs 510 and 512 are also dynamically scalable in that they can compute one 16×16 bit product term or two 8×8 bit product terms. Note that other bit-width operations could be considered for all of the functional units, such as operations on 4, 16, 32, 64 or 128-bit elements. Similarly, the length of the data vectors could be extended (e.g., 192-bit, 256-bit, etc.) or reduced (e.g., 96-bit, 64-bit, etc.) without any fundamental restrictions.

A pair of MUX/adders 506 and 508 follow Multiplier/CSAs 510 and 512 to make up the remaining portion of a Wallace Tree for performing carry-save partial product addition in a single cycle. The results from MUX/adders 506 and 508 and multiplier/CSAs 510 and 512 are combined in carry-propagate adders 502 and 504, which are the final stage in the multiplication process. The results from carry-propagate adders 502 and 504 pass through saturation logic units 518 and 520 and left shift units 522 and 524 for fractional multiplication operations. The left shift operations may also precede the saturation logic in other embodiments. Vector ALU slice 304 also contains a vector accumulator function (described below), used for temporarily containing the double field size (DFS) results of multiplication or MAC operations. For example, a vector MAC operation on eight 16-bit data elements produces eight 32-bit product elements, which are added to the current contents of vector accumulator registers 512 and 514, and the results of the operation can be locally stored back into the vector accumulator registers 512 and 514 (each of which provide 128-bits of storage), and can additionally be written to the register file via the VRD and VRE destination vector data buses via logic 426.

Note that both portions of the I-channel (or Q-channel) group ALU (or vector arithmetic logic unit) 232 (or 234) are capable of outputting two result or destination vectors. This capability allows compound instructions, such as simultaneous vector addition and subtraction to take place in a single clock cycle. Other examples of compound instructions include simultaneous vector difference (i.e., subtraction) and maximum, simultaneous vector difference (i.e., subtraction) and minimum, simultaneous vector compare and maximum, and simultaneous vector compare and minimum operations. The vector difference and minimum (maximum) instruction computes the difference between two source vectors, and simultaneously selects the minimum (maximum) value on a field by field basis between the two source vectors (in a single clock cycle). The resulting difference vector is output on the VRE data bus, and the selected minimum (maximum) vector is output on the VRD bus. This operation is useful for accelerating turbo decoding algorithms. The vector multiplication may also simultaneously output two destination vectors VRD and VRE, as described above. Note that the term "vector arithmetic logic units" refer to any of the above arithmetic logic units (e.g.—vector addition/subtraction, vector multiplication, etc.) which operate on vector data.

Figure 6:
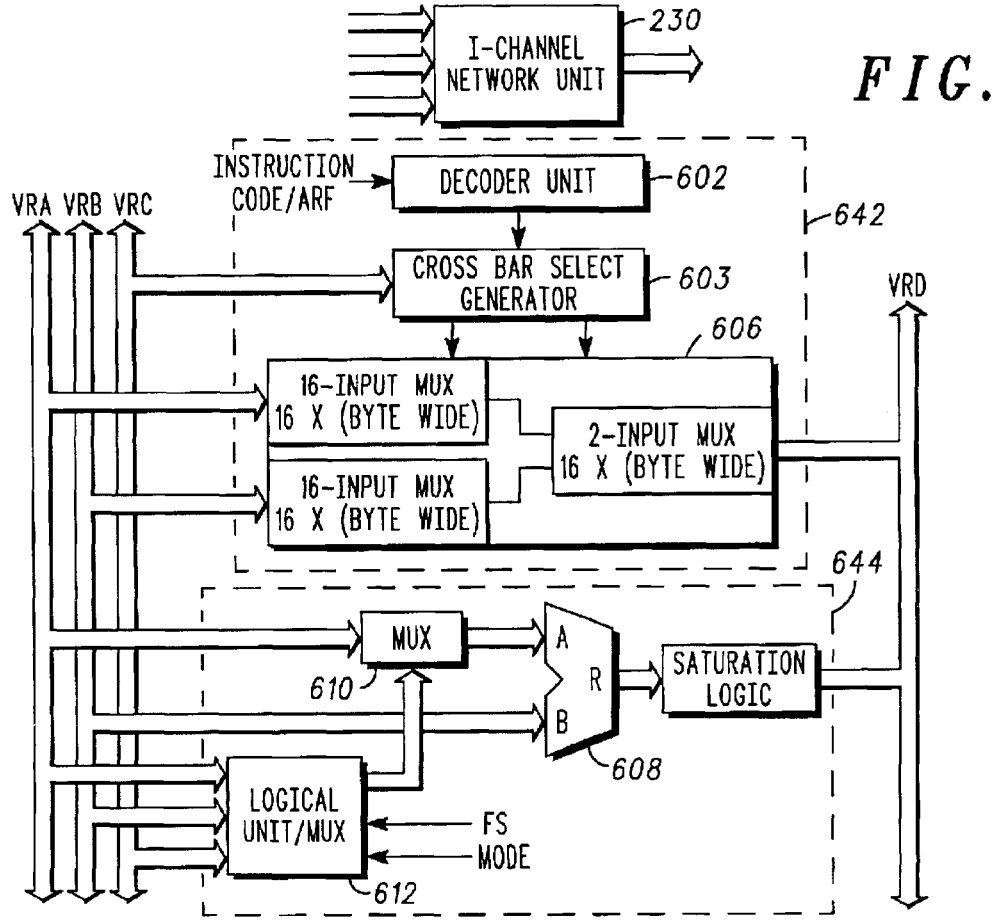
FIG. 6 shows a more detailed functional diagram of a network unit in accordance with the invention.

FIG. 6 shows additional detail concerning the I-channel (or Q-channel) vector network unit 230 (or 236). Note that I-channel network unit 230 and Q-channel network unit 236 can be identical in function, as they are in this example. Vector permute unit 642 of vector network unit 230 permits arbitrary reordering of the bytes within the two 128-bit input vectors. Thus, since the 128-bit input vectors VRA and VRB are comprised of 16 bytes each, any of those 32 bytes can be selected and placed into any selected output byte of the output vector VRD. The type of permute operation is specified by an instruction control field for the vector network units A and B and the VLIW instruction decoder 216.

Vector permute unit 642 hardware includes a 32 byte to 16 byte crossbar switch 606 which can select any 8 bit (byte) portion of either of the input vectors VRA or VRB and place it into any 8-bit portion of the output vector VRD, for each of the 8-bit fields in the output vector. Thus, as described, any byte from either input vector VRA or VRB can be placed into any byte in the output vector VRD, to emulate several data element shifting and reordering operations. Vector permutation operations may utilize the VRC vector, an immediate field (i.e., immediate data value) in the instruction code, or an address register file (ARF) value to control the selection operation (or function) described above. The data value on the VRC bus can be used to explicitly control the field by field operation (directly specify which byte in source vector VRA or VRB is to be placed in a particular byte of destination vector VRD) of crossbar switch 606 via crossbar select generation unit 603. Crossbar select generation unit 603 may alternatively be (byte-wise) controlled by function decoder unit 602 which decodes instruction modes from an address register file value or takes an immediate value from the instruction itself, based on the instruction type. For example, an address register value can be used to enact a left or right vector shift operation by a variable number of bytes (determined by the value of the specified address register value during program execution), which is useful for emulating variable delay lines for filtering operations. The decoder 602 is responsible for translating the desired shift value into the proper crossbar control signals for the desired operation.

Vector logical slice unit 644 performs logical intrafield operations and rapid calculation of Viterbi-type operations. A 32-bit slice of the full 128-bit unit is shown for simplicity. Operations such as multiple element left or right shifts or barrel rotations can be performed on each element of a vector in partitioned ALU 608 within a single clock cycle. Signed shift values are allowed that enable a single shift value to specify either a right or left shift, depending on the sign of the shift value. For example, the data fields (elements) in vector VRA may each be shifted by the number of bits specified by each respective field in vector VRB, in either the right or left direction (specified by the type of instruction and sign of the shift amount). Additionally, explicit logic is provided to support Viterbi select and shift left operations (described below). Logical unit/mux is 612 performs logical operations such as AND, OR, EXCLUSIVE OR (XOR), NOT, vector packing and unpacking, and also provides multiplexing capability for Viterbi operations. MUX 610 is utilized for forwarding Viterbi, vector packing and unpacking results to the output vector VRD. The partitioned ALU 608 may also perform a rounding function on data elements while packing or compressing the data elements from a larger field size to a smaller field size (e.g., through the use of half adder structures). In the general sense of the term, "vector arithmetic logic units" may also include vector network (vector permute and vector logical) units.

Figure 7:
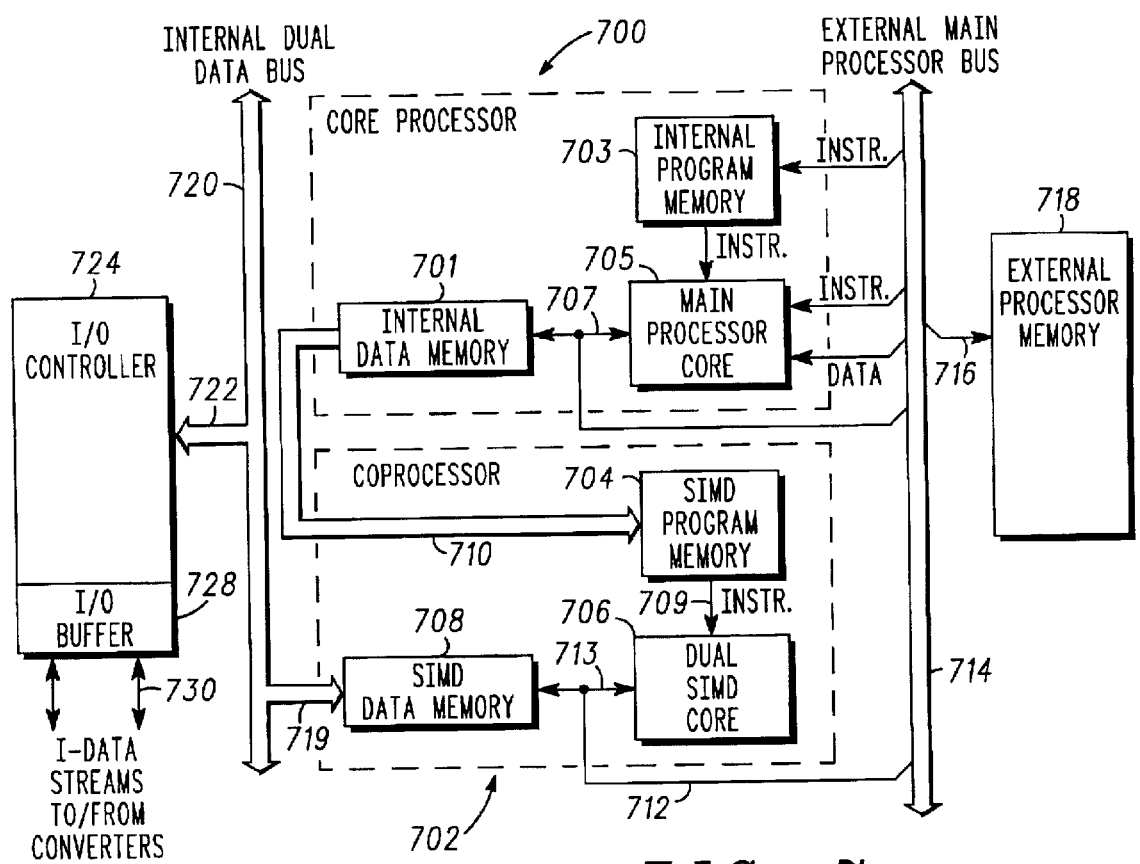
FIG. 7 shows a processor configured as a coprocessor in accordance with the present invention.

The present invention may be interfaced with other processors and peripherals in a variety of ways. For example, with reference to FIG. 7, exemplary interfaces are shown between a core processor or DSP 700 and the processor of the present invention, vector processor 702. In the example of FIG. 7, vector processor 702 executes routines from internal program memory space 704 and processes data from SIMD data memory spaces 708. Vector processor 702 operates, in the simplest case, under the guidance of core processor 700. Core processor 700 downloads algorithms (or subroutines) to vector processor 702's internal program memory space 704. Downloading of programming may, for example, be accomplished through a peripheral bus 710 or alternatively a DMA interface. Internal program memory 704 typically provides instructions to dual SIMD vector processor 706 via instruction bus 709. Dual SIMD vector processor 706 carries out computations and transfers results to SIMD processor data memory 708, which may then be transferred via main processor memory bus 714 by DMA interface 712. DMA interface 712 may also be utilized to load vector processor 702 data memories with coefficient data (for example, twiddle factors for fast Fourier transforms (FFTs)), or other fixed data, as required. The main processor bus 714 is connected via bus 716 to (possibly external and/or non-volatile) processor memory 718. The (external) main processor memory 718 may also include an instruction bus which provides instructions to internal program memory or cache 703 of core processor 700.

SIMD data memory 708 receives operands via a dual data buses 719, 720 and 722 which are, in turn, connected to an I/O controller 724. SIMD data memory 708 preferably includes multiple (banked) data memories that are connected to dual SIMD vector processor 706 via dual data buses, as shown in 713. Data bus 713, shown generally in FIG. 7, is bi-directional and may include a plurality of cross connections for rapid exchange of real and imaginary operands between the vector processor units of dual SIMD vector processor 706 and data memory 708. I/O controller 724 may also include I/O buffers 728 which store I/O sample data streams to and from converters. Note that various typical forms of memory (e.g., internal, external, single port, dual port, multi-port, cache, etc.) may be employed in the place of any of the above described memories.

The architecture of the present invention, particularly when vector processor 702 is implemented as a coprocessor, will minimize the impact of high throughput signal processing on the core processor 700. In the example of FIG. 7, processor 702 is generally uninterruptible, and real-time tasks on it must be scheduled by an external controller such as core processor 700. Such a scheme allows core processor 700 to act as a global system controller, thus eliminating coordination problems typically associated with multiprocessor arrays, and, at the same time, simplifying the design of vector processor 702 by elimination of exception cases and context switching.

Figure 8:
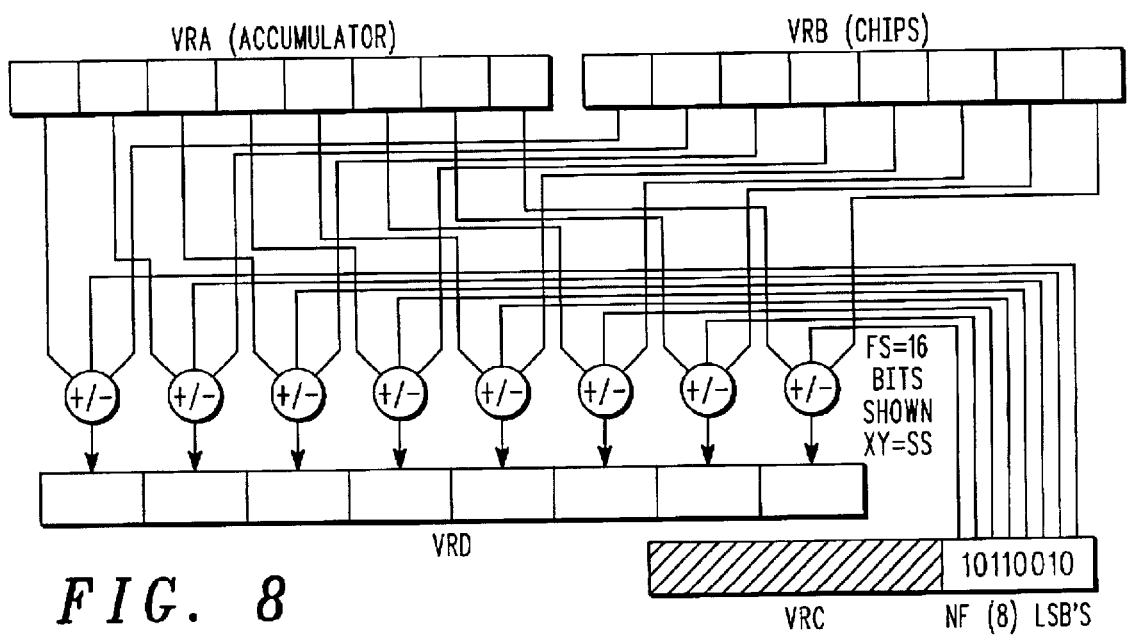
FIG. 8 shows an example of a conditional negate-and-add operation and vector conditional negate-and-subtract operation performed by a processor in accordance with present invention.

Several examples of the advantageous capabilities and operation of processor 200 are shown in FIGS. 8–11. All of the described operations can take place within a single clock cycle. For these examples, a commonly-used abstraction of mapping a register, such as one from vector register file 226 and 228, to a bus, such as VRA, is used. With this abstraction, a bus and a register value are equivalent for description purposes. With reference to FIG. 8, I-channel group ALU 232 enables vector operations that individually add or subtract elements from a vector on the VRB bus, to individual elements of another vector on the VRA bus example, based on a packed control field contained on the VRC bus. The individual NF least significant bits (LSBs) (where NF is equal to the number of data fields in vector VRA, or 128/FS in this example) on the VRC bus conditionally control the operation on each respective field of the VRB bus. For example, if the respective bit n of vector VRC is set (equal to a logic one value), then the n-th respective data element of VRB will be subtracted from the n-th respective element of vector VRA, else if the respective bit n of vector VRC is cleared (equal to a logic zero value), then the n-th respective data element of VRB will be added to the n-th respective element of vector VRA, as shown in FIG. 8. The results of the conditional operation are stored in destination vector VRD. This operation is useful for accelerating many common communications algorithms, such as despreading and Viterbi decoding operations.

Figure 9:
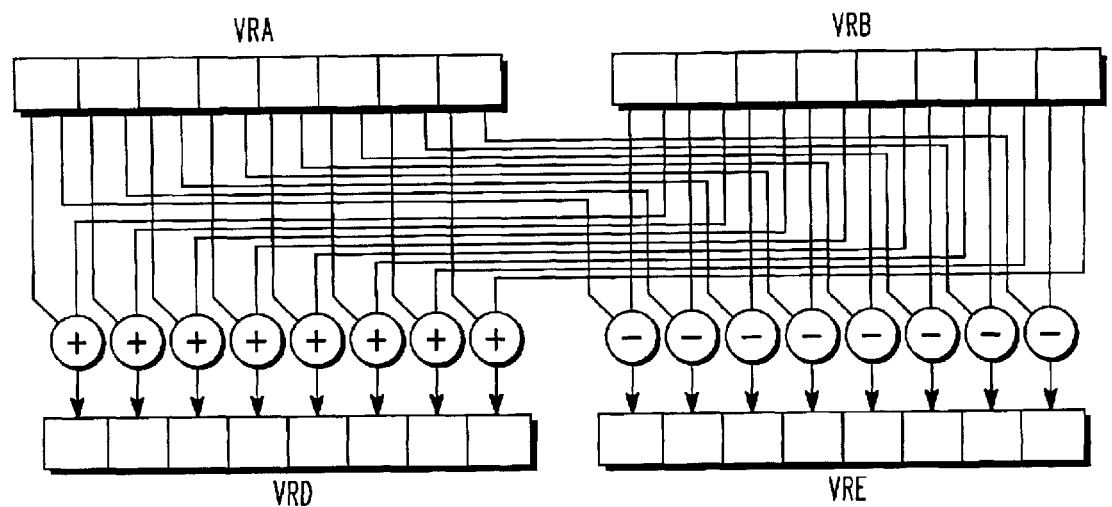
FIG. 9 shows an example of a vector add-and-subtract operation performed by a processor in accordance with present invention.

FIG. 9 shows an example of a compound operation; a vector add and subtract operation, in which vectors on the VRA and VRB busses are simultaneously added and subtracted, and placed in output vectors VRD and VRE. Dedicated subtraction unit 401 and ALU 402 enable the present invention to perform a simultaneous vector add and vector subtraction and place the results on the VRD and VRE busses (all in one clock cycle), respectively. This operation is useful for accelerating Viterbi, FFT, and Fast Hadamard Transform (FHT) operations, among others.

Figure 10:
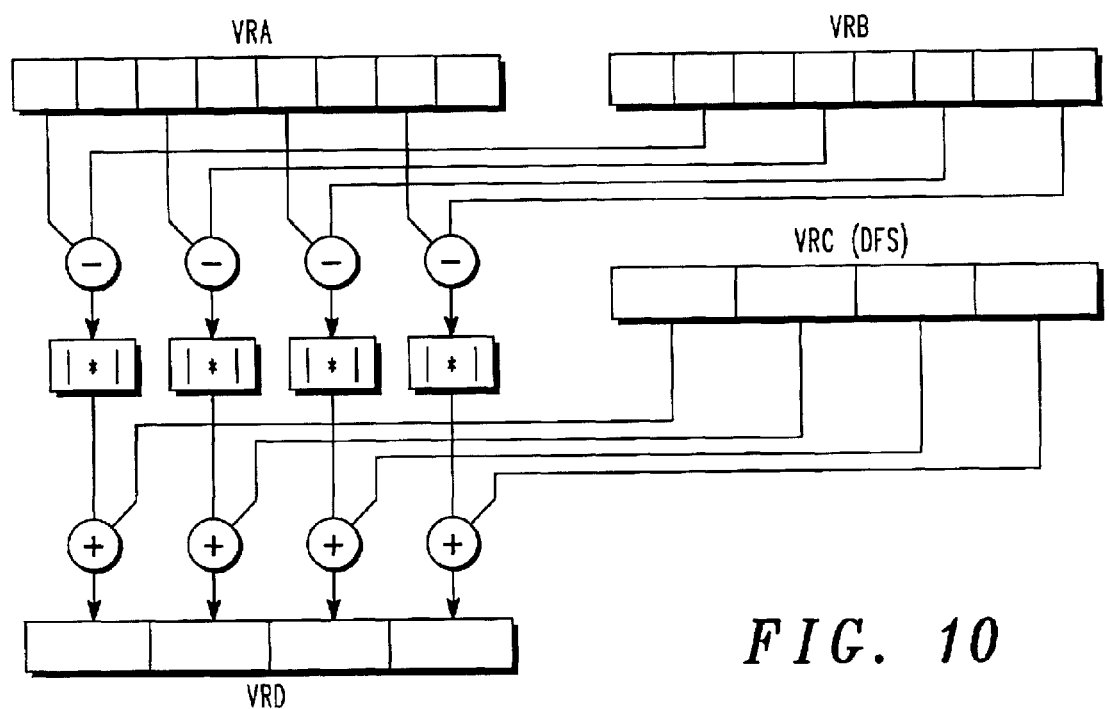
FIG. 10 shows an example of a vector absolute-difference-and-add operation performed by a processor in accordance with present invention.

FIG. 10 illustrates another example of one of the many compound operations that are possible with the dedicated subtraction ALU. A single cycle absolute difference and add operation is implemented that allows the absolute difference between data vector VRA and VRB (|VRA−VRB|) to be added into an accumulation data vector VRC. The result is output via data vector VRD, and is useful for various equalization and estimation algorithms. To enable this operation, demultiplexer 416 is used to feedback the result from subtraction unit 401 to mux 410, which is then either added or subtracted with each respective data field in vector VRC, depending on the sign of the respective dedicated subtraction result fields. Other useful compound operations that are possible with the dedicated subtraction unit 401 are simultaneous vector compare and maximum, or simultaneous vector compare and minimum operations. Simultaneous vector difference and maximum or vector difference and minimum operations are also possible with the same ALU hardware.

Figure 11:
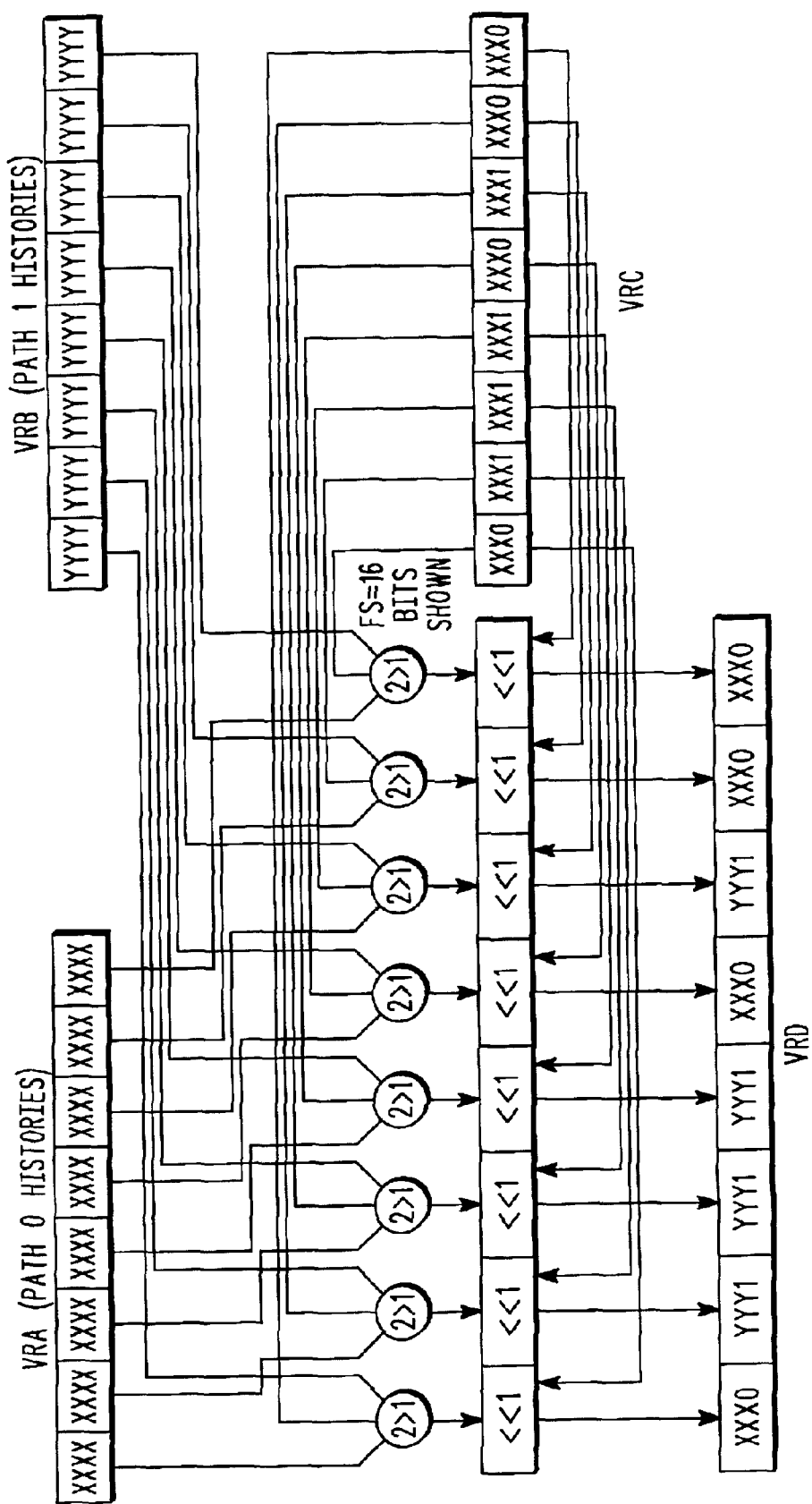
FIG. 11 shows an example of a vector Viterbi operation performed by a processor in accordance with present invention.

A vector select and Viterbi shift left operation is provided with vector logical ALU 644 (VSFX(L)). The operation selects either the VRA or VRB vector elements on a field by field basis depending on the least significant bit (LSB) in each field (i.e., selection flag values) of vector VRC. The respective LSB in each field of vector VRC (or respective selection flag value) is appended to the respective selected vector element and left shifted by one bit. In this case, vector logical unit/mux 612 performs the selection operation and partitioned ALU slice 608 performs the left shift (<<1) operation. The result of the operation is placed on the VRD bus. An example of this operation is illustrated in FIG. 11. This operation greatly accelerates Viterbi-based decoding and equalization algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus (302) for performing dynamically scalable single instruction multiple data (SIMD) operations comprising:

a first vector arithmetic logic unit (402) operably coupled to a first data vector (VRA) from a first input data bus, a second data vector (VRB) from a second vector data bus, and a third data vector (VRC) from a third vector data bus to produce a first vector result (VRD) wherein the first vector functional arithmetic logic unit (402) performs individual conditional operations on fields of VRA and VRB to produce VRD, and wherein the conditional operations are based on VRC;

a second vector arithmetic logic unit (401) operably coupled to the first data vector (VRA) from the first input data bus, the second data vector (VRB) from the second input data bus, and to the first vector arithmetic logic unit, wherein the individual conditional vector operations in the first vector arithmetic logic unit are conditionally controlled by a vector result from the second vector arithmetic logic unit.

2. The apparatus of claim 1 wherein the first vector arithmetic logic unit performs addition and subtraction.

3. The apparatus of claim 2 wherein the second vector arithmetic logic unit performs subtraction.

4. The apparatus of claim 1, wherein a sign of the vector result from the second vector arithmetic logic unit controls individual conditional SIMD field operations of the fist vector arithmetic unit within a single clock cycle.

5. The apparatus of claim 1, wherein the vector result from the second vector arithmetic logic unit are fed back as a vector input to the first vector arithmetic logic unit within a single clock cycle.

6. The apparatus of claim 1, wherein the vector result from the second vector arithmetic logic unit is output as a second vector result (VRE).

7. An apparatus (302) for performing dynamically scalable SIMD operations, the apparatus (302) comprising:

a first vector arithmetic unit (402) having a first, second, and third data vector as inputs, the first vector arithmetic unit capable of performing at least vector addition and subtraction operations, wherein individual SIMD field operations in the first vector arithmetic unit are conditionally controlled by at least a portion of the third data vector input; and a second vector arithmetic unit (401) operably coupled to the first vector arithmetic unit.

8. The apparatus of claim 7 wherein the first vector arithmetic unit performs at least vector addition and subtraction.

9. The apparatus of claim 7, wherein packed bitwise values of the third data vector alter individual SIMD field operations of the first vector arithmetic unit within a single clock cycle.

10. The apparatus of claim 7, wherein a dynamically scalable vector addition and subtraction operation is performed by the first and the second vector arithmetic units and output simultaneously, within a same clock cycle.

11. The apparatus of claim 7, wherein the second vector arithmetic unit is a dedicated vector subtraction unit.

12. The apparatus of claim 7, wherein a dynamically scalable vector conditional negate and add operation is performed within a single clock cycle by the first vector arithmetic unit.

* * * * *